United States Patent [19]
Harrington et al.

[11] Patent Number: 5,710,361
[45] Date of Patent: *Jan. 20, 1998

[54] IN-SITU TREATMENT OF WASTE STACKS, SOILS OR EARTH MATERIALS TO IMMOBILIZE METALS CONTAINED THEREIN

[75] Inventors: Joseph G. Harrington, Moscow; Roger B. Humberger, Pocatello; Michael L. Orr, Pocatello; Charles H. Schwartz, Pocatello, all of Id.

[73] Assignee: J. R. Simplot Company, Boise, Id.

[*] Notice: The term of this patent shall not extend beyond the expiration date of Pat. No. 5,632,715.

[21] Appl. No.: 772,174

[22] Filed: Dec. 18, 1996

Related U.S. Application Data

[63] Continuation of Ser. No. 573,230, Dec. 15, 1995, Pat. No. 5,632,715.

[51] Int. Cl.$^6$ .................. A62D 3/00; B09B 3/00
[52] U.S. Cl. .................. 588/256; 405/128; 588/259
[58] Field of Search .............. 71/901; 166/246; 405/128; 435/262.5; 588/256, 259

[56] References Cited

U.S. PATENT DOCUMENTS

| | | |
|---|---|---|
| 4,159,944 | 7/1979 | Erickson et al. . |
| 4,255,067 | 3/1981 | Wright .................. 405/129 X |
| 4,292,160 | 9/1981 | Marcantonio . |
| 4,311,593 | 1/1982 | Benjes et al. . |
| 4,318,789 | 3/1982 | Marcantonio . |
| 4,354,937 | 10/1982 | Hallberg . |
| 4,464,081 | 8/1984 | Hillier et al. ............ 588/259 |
| 4,732,681 | 3/1988 | Galun et al. . |
| 4,789,478 | 12/1988 | Revis et al. . |
| 4,857,203 | 8/1989 | Pope et al. . |
| 4,861,482 | 8/1989 | Frankenberger, Jr. et al. . |
| 4,891,067 | 1/1990 | Rappas et al. . |
| 5,076,927 | 12/1991 | Hunter . |
| 5,084,261 | 1/1992 | Caesar . |
| 5,155,042 | 10/1992 | Lupton et al. ............ 588/256 X |
| 5,178,762 | 1/1993 | Pokora et al. . |
| 5,190,406 | 3/1993 | Shannonhouse et al. .......... 405/129 |
| 5,202,033 | 4/1993 | Stanforth et al. ............ 588/256 X |
| 5,263,795 | 11/1993 | Corey et al. ............ 405/128 |
| 5,266,210 | 11/1993 | McLaughlin . |
| 5,316,751 | 5/1994 | Kingsley et al. . |
| 5,338,460 | 8/1994 | Yen . |
| 5,348,422 | 9/1994 | Manchak, III et al. .......... 405/128 |
| 5,362,181 | 11/1994 | DenBesten . |
| 5,387,271 | 2/1995 | Crawford et al. . |
| 5,403,496 | 4/1995 | Kramer et al. ............ 588/256 X |

*Primary Examiner*—George A. Suchfield
*Attorney, Agent, or Firm*—Wells, St. John, Roberts, Gregory & Matkin, P.S.

[57] ABSTRACT

A process for in situ immobilization of metals in waste stack affected zones including a waste stack and any adjacent boundary zone. One form of the process includes: (a) forming at least one treatment passageway which extends within the waste stack affected zone; (b) injecting a treatment liquid into the treatment passageway; said treatment liquid including at least one microbe nutrient which is capable of sustaining activity of the at least one microbe; (c) providing at least one microbe in sufficient proximity to the treatment passageway to receive treatment liquid therefrom; said at least one microbe being capable of growing in the presence of said treatment liquid; said at least one microbe also being capable of producing microbial sulfides which are sulfide by-products of microbial activity in the waste stack affected zone; (d) reacting the microbial sulfides in situ with metal ions or metal-containing compounds contained in said waste stack affected zone to form metal sulfides; (e) reducing solubility of the metal ions or metal-containing compounds contained in the waste stack affected zone as a result of forming the metal sulfides; and (f) inhibiting the migration rate of metal ions or metal-containing compounds within or from the waste stack affected zone.

51 Claims, 4 Drawing Sheets

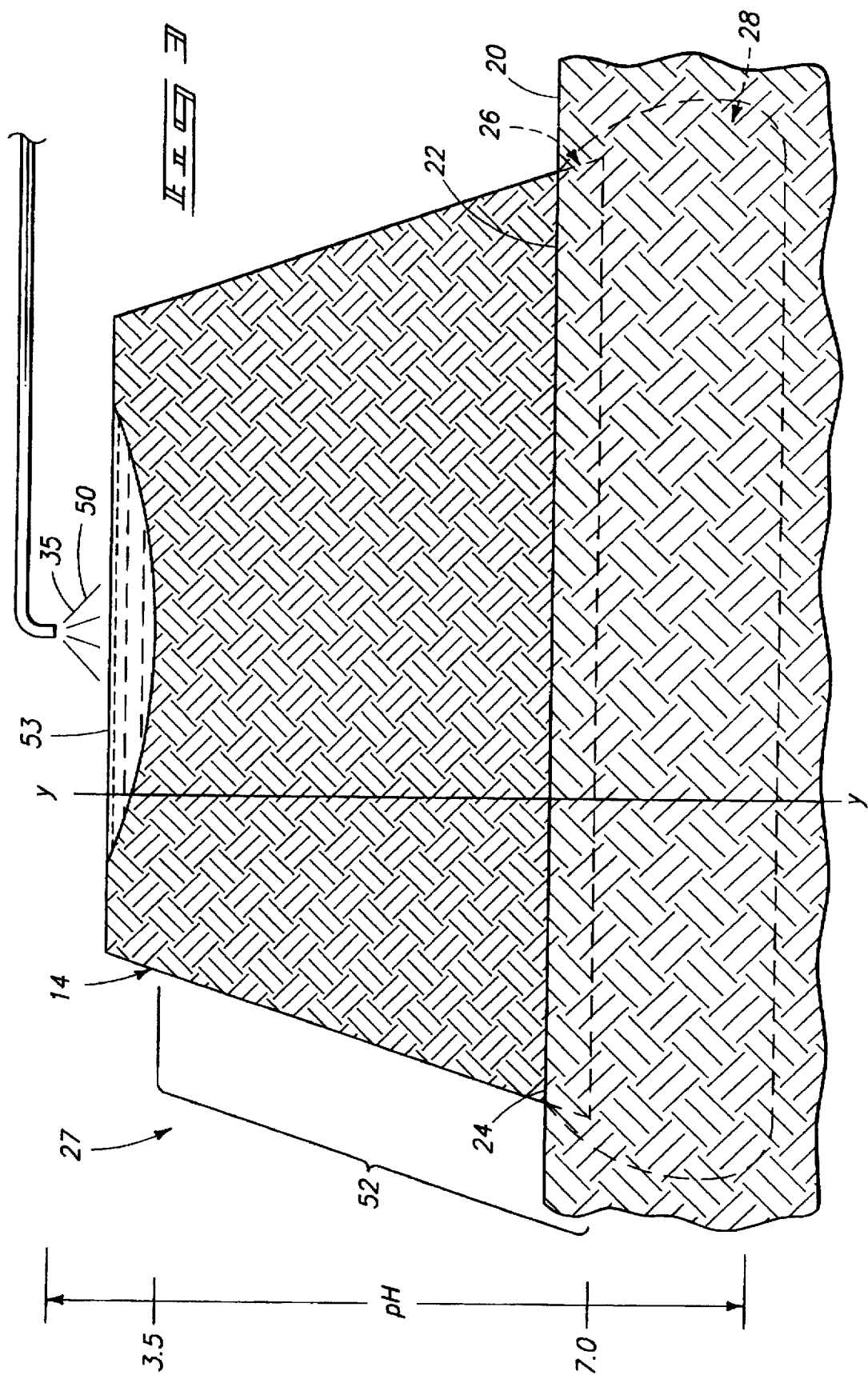

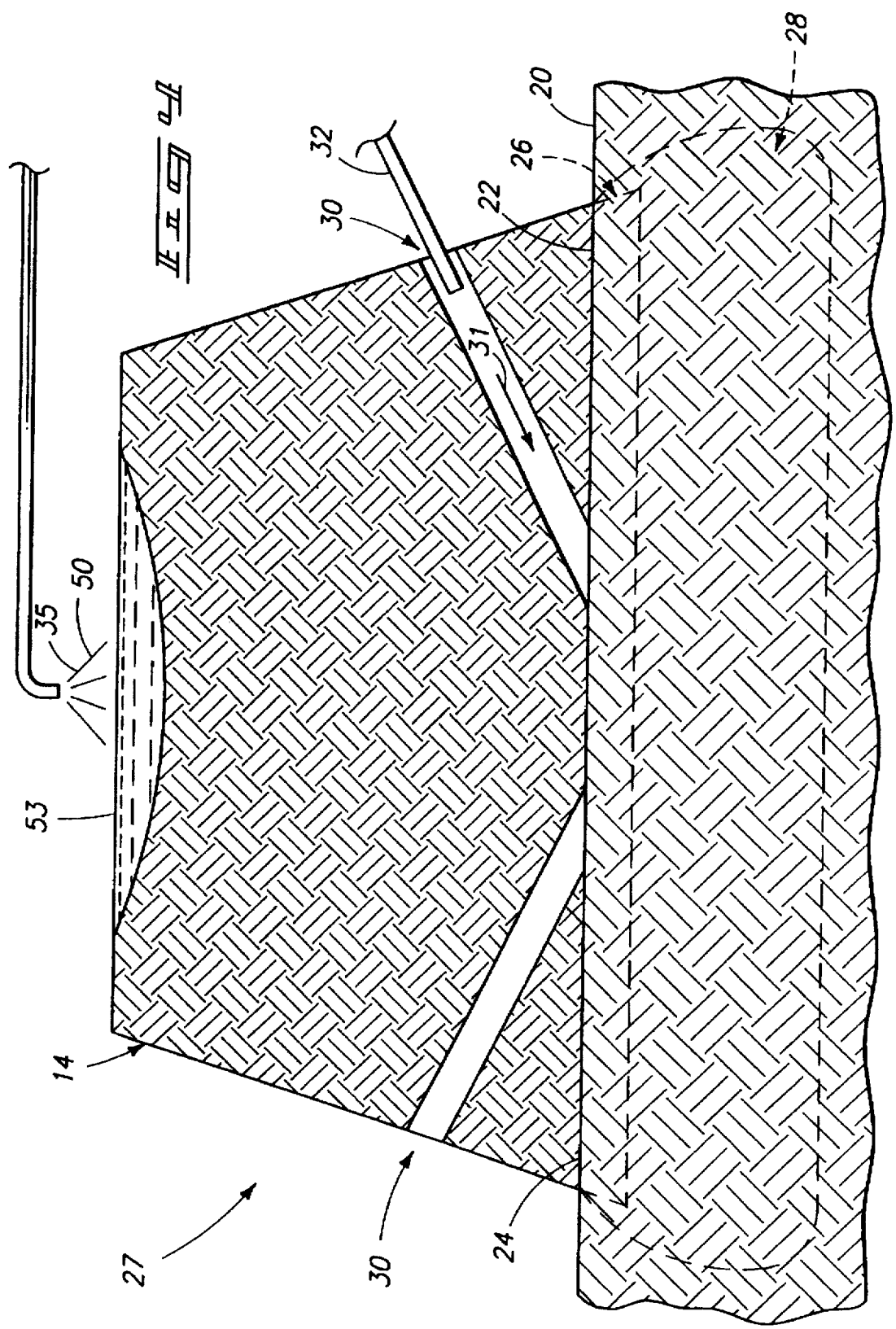

IN-SITU TREATMENT OF WASTE STACKS, SOILS OR EARTH MATERIALS TO IMMOBILIZE METALS CONTAINED THEREIN

CROSS-REFERENCES TO RELATED CASES

This is a continuation of U.S. patent application Ser. No. 08/573,230, filed Dec. 15, 1995, now U.S. Pat. No. 5,632,715.

TECHNICAL FIELD

This invention relates to methods for in situ immobilization of metals in waste stacks and waste stack affected zones.

BACKGROUND OF THE INVENTION

Waste stacks are generated by many types of industrial processes, often as a result of the extraction of valuable materials. The waste stacks are frequently piles of economically invaluable material left over from the industrial processes. For instance, power plants often generate waste stacks of ash. The ash is left over when energy is extracted from fuel by burning. Mining processes also often generate waste stacks. The waste stacks contain minerals left over after a valuable metal or mineral is extracted from the mined earth materials. For example, phosphorus mines often result in waste stacks containing predominantly gypsum. The waste stack gypsum is a relatively invaluable mineral left over after phosphorus is removed from the mined materials.

In many instances, waste stacks are formed as follows. First, the residual or waste material is combined with water to form a waste slurry. This waste slurry is then flowed to a settling pond where the solids contained in the waste slurry settle out. Water also evaporates from the settling pond. Over time, the settled solids leave behind a stack of waste material. Some water is retained in the settled waste material which makes up the waste stack. This process of deposition settling and evaporation is repeated until the resulting waste stack is too large for the process to economically continue, or is terminated for other reasons. If needed, a new waste stack is started and grows in a similar fashion. FIG. 1 shows a mine 12 which has been in operation for a significant period of time and is surrounded by a number of waste stacks 14. The individual waste stacks 14 are often huge, sometimes comprising millions of cubic yards. The amount of material currently stored in waste stacks is enormous, and it continues to increase as mining and other industries continue to produce and develop new operations.

A problem associated with waste stacks is toxic metal migration. The actual percentage of water-soluble toxic metals in a given waste stack is usually very small; for example, less than 0.1 percent. However, because the waste stacks are often very large, the total amount of toxic materials in a waste stack is often large enough to present some risk to surrounding areas and ground water. These risks arise in part due to potential metals migration from the transport of liquid slurry to the waste stack. The slurry water may percolate into the soil in addition to evaporating or remaining in the waste stack.

Toxic metals potentially found in waste stacks include but are not limited to Pb, Hg, Cd, Fe, As, Se, Cu, Cr, Ni, Zn, Co, Mn and Ag. Over time such metals can leach out of the waste stacks and into ground water. Thus, it is desirable to keep the metals within or near the waste stacks to minimize the danger posed by such metals.

Keeping the metals within or near the stack is often difficult, especially since the metals may be present in water-soluble forms. Such water-soluble forms can migrate as metal solutes whenever water moves through the stacks. Since the stacks are frequently exposed to water, either in the form of rain or in the form of waste water deposited on the stacks, water-soluble metals or metal compounds present in the stacks are exposed to conditions which may encourage their migration. In some situations, metals have already begun migrating out of existing waste stacks and into a boundary zone or layer below the waste stacks. Thus, it is desirable to have a method which will not only inhibit further migration of metals from the waste stacks, but which will also inhibit the migration of metals that are in a boundary layer beneath the waste stacks.

One prior art method for containing metals within a waste stack is to insert a liner beneath the waste stack. However, since the waste stacks need to be lifted or removed to utilize this method, the method is too expensive and time-consuming to be a practical or economical treatment for many waste stacks.

A principal object of this invention is to provide a treatment method for containing metals within an existing waste stack or waste stack affected zone. Meeting this objective is complicated by the requirement that any acceptable treatment method should not result in emissions of toxic materials or malodorous gases. The treatment method should also be economical and preferably not result in substantial amounts of additional waste. Additionally, the difficulty in finding an acceptable treatment method is exacerbated by other chemical constituents of the waste stack which may counteract various attempts to chemically treat the waste stack. Thus, there has long been a need in the art of industrial waste management for an acceptable method for dealing with large waste stacks containing metal contaminants in low concentration levels; and in particular, a need in the art of phosphate fertilizer production for dealing with large gypsum waste stacks containing small concentrations of metals.

BRIEF DESCRIPTION OF THE DRAWINGS

Preferred embodiments of the invention are described below with reference to the accompanying drawings, which are briefly described below.

FIG. 3 shows a sectional side view of a waste stack being treated according to a second embodiment of the invention. Microbe nutrients are being flowed into a surface pool on the stack. A pH scale is shown to indicate the approximate regions of the waste stack zone in which biological activity occurs.

FIG. 4 shows a sectional side view of a waste stack affected zone that is being treated according to a third embodiment of the invention. Microbe nutrients are both flowed into a surface pool on the stack and injected into the stack.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

A general object of the present invention is to impede the rate of migration of the toxic metals within and from a waste stack and its adjacent boundary zone. This is accomplished by treating the waste stack using the novel methods of this invention.

Figure 1:
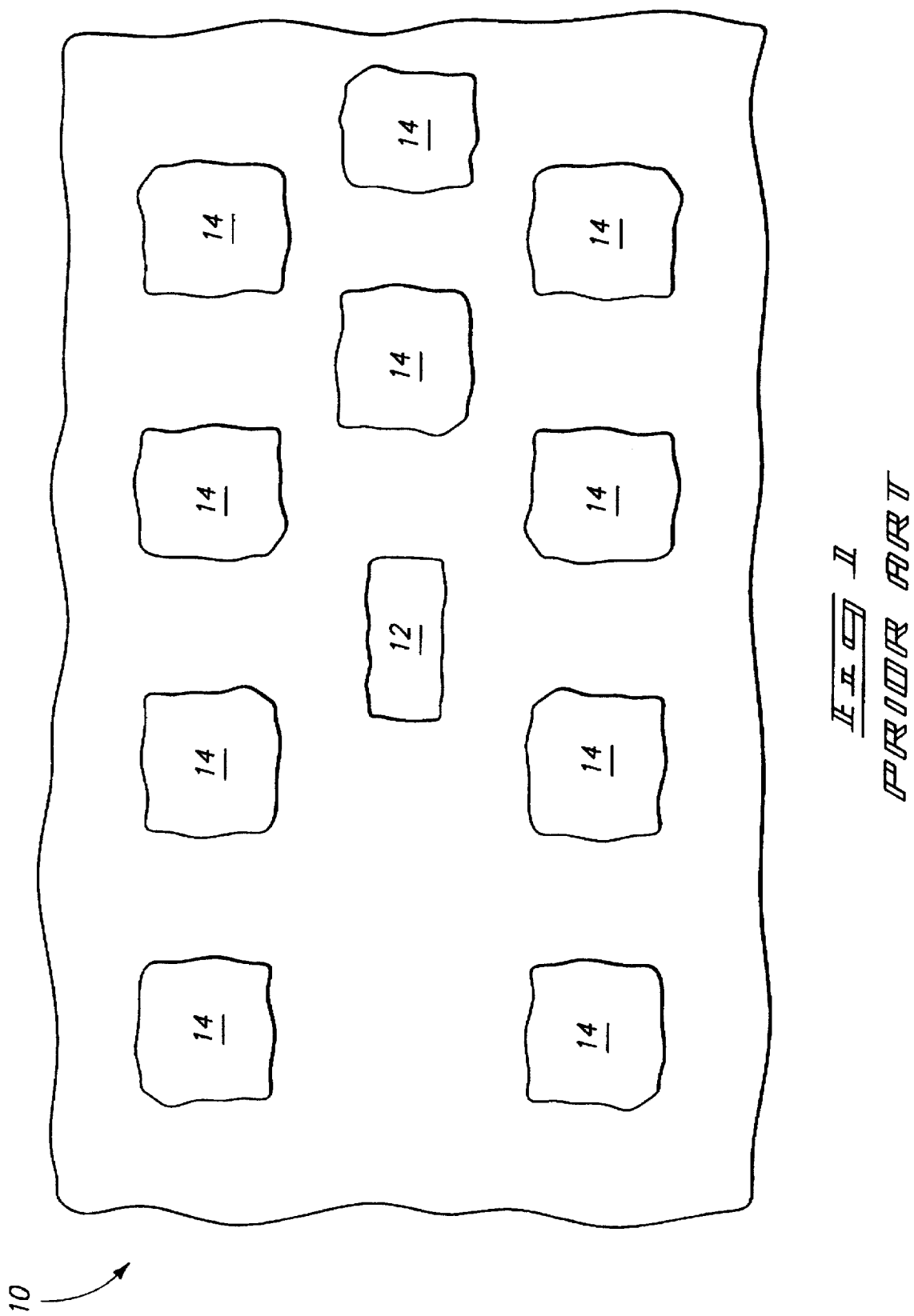
FIG. 1 is a top view of a prior art mining area showing a mine surrounded by a number of waste stacks.
Figure 2:
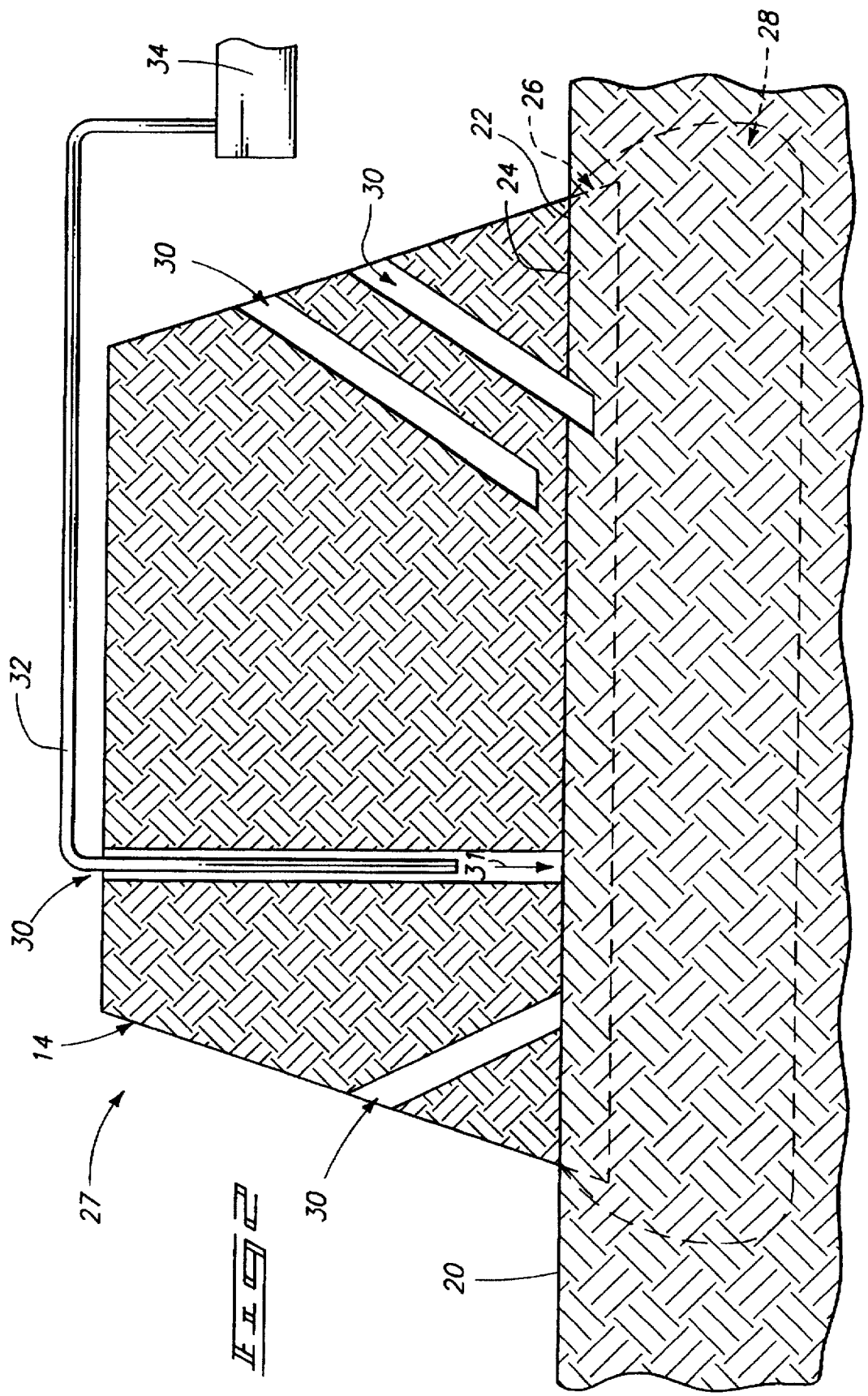
FIG. 2 is a sectional side view of a waste stack affected zone being treated according to a first embodiment of the invention. Treatment liquids are being injected into treatment passageways in the waste stack.

FIGS. 2–4 illustrate three forms of the present invention. These forms of the invention are expected to apply to the following situation. A waste stack 14 is provided over subjacent soil or other supporting earth materials 20. A soil-waste stack interface 24 is provided where waste stack 14 meets soil 20. Soil-waste interface 24 extends along a base 22 of waste stack 14. One or more water-soluble forms of one or more toxic metals, such as selected from the group consisting of Pb, Hg, Cd, Fe, As, Se, Cu, Cr, Ni, Zn, Co, Mn and Ag exist within waste stack 14 and may be rendered less mobile by the novel processes taught in this application. Such toxic metal contaminants typically exist at relatively low concentration levels, 0.1% by weight or less.

As shown in FIGS. 2–4, a metal-containing boundary layer or boundary zone 26 may also exist adjacent to waste stack 14. Metal-containing boundary layer 26 may exist if waste stack 14 is exposed to water for a significant period of time. The water leaches toxic metals out of stack 14 and past soil-waste interface 24 thereby forming the metal-containing boundary layer 26.

Waste stack 14, together with any present metal-containing boundary layer 26, defines a waste stack affected zone 27. A general object of this invention is to immobilize the toxic metals in situ within the waste stack affected zone 27 to thereby inhibit substantial migration of these toxic metals and prevent movement of contaminating amounts into an extended area 28.

In one form, the invention includes the concept of utilizing biological activity of microbes to generate sulfides in waste stack zone 27. The microbially-produced sulfides, which are referred to herein as microbial sulfides, are combined with toxic metals in the affected zone to thereby convert the metals into metal sulfides. Preferably the microbially produced sulfides will react with metals or metal ions such as selected from the group consisting of Pb, Hg, Cd, Fe, As, Se, Cu, Cr, Ni, Zn, Co, Mn and Ag. The toxic metals may be in the form of metal ions, metal ion complexes, or metal containing compounds. A possible mechanism for the conversion to metal sulfides, using the cadmium ion as an example metal ion, is:

(1) $C_6H_{12}O_6 + NAD + H + \rightleftharpoons 6 CO_2 + 6 H_2O + NADH$ (2) $10 NADH + SO_4^{2-} \rightleftharpoons H_2S + 10 NAD + 4 H_2O$ (3) $H_2S(aqueous) + H_2O \rightleftharpoons H_3O^+ + HS^-(aqueous)$ (4) $HS^- + H_2O \rightleftharpoons S^{2-} + H_3O^+$ (5) $Cd^{2+}(aqueous) + S^{2-}(aqueous) \rightleftharpoons CdS(solid)$ In the shown mechanism, NAD is nicotinamide adenine dinucleotide, which is used ubiquitously in biological transport mechanisms.

Once metal sulfides, or other sulfided metallic forms, are formed, the complexed metals become relatively insoluble in water and tend to precipitate out onto other materials contained in the stack. The metals are thereby held in the stack and boundary zone, preventing further water-borne migration.

It is believed that a variety of microbes which generate appreciable quantities of sulfides can potentially be used in the treatment methods of the present invention. For example, microbes of the genera Desulfovibrio, Desulfomonas and Desulfomaculum are known to generate appreciable quantities of sulfides as a by-product of their growth and general biological activity. They are believed to be suitable for use in the present invention.

Three specific embodiments of the present invention will now be described in detail.

First Embodiment

Referring to FIG. 2, a first embodiment of the present invention comprises forming at least one treatment passageway 30 extending into waste stack zone 27. Passageway 30 will preferably be formed by drilling into waste stack zone 27. It is anticipated that treatment passageway 30 will preferably extend to a location adjacent to soil-waste stack interface 24. However, it is also anticipated that passageway 30 could terminate above or below soil-waste stack interface 24. If the waste stack zone contains a region wherein the waste stack materials have a pH from about 3.5 to about 7, treatment passageway 30 will preferably be provided to a depth wherein passageway 30 reaches this region. This region will be a potential biological activity zone, as discussed below.

After passageway 30 is formed, a treatment liquid 31 can in one form of the invention be introduced or injected into zone 27 through passageway 30. In the shown embodiment, treatment liquid 31 is introduced into stack zone 27 through an injection tube 32. Preferably, tube 32 will vigorously force liquid 31 into treatment passageway 30 so that liquid 31 penetrates into the matrix of the stack 14 or other portions of zone 27.

Treatment liquid 31 enters injection tube 32 from a treatment liquid containing reservoir 34 which is shown in fluid connection with injection tube 32. It is anticipated that treatment liquid 31 will preferably be injected utilizing a pump-driven flow. However, it is also anticipated that treatment liquid 31 may be injected utilizing a gravity-driven flow.

Treatment liquid 31 is primarily constituted of a suitable liquid base, most preferably water. In addition to the water or other liquid base, there are a number of additional constituents in the preferred form.

Treatment liquid 31 preferably includes at least one microbe nutrient which is capable of sustaining biological activity of at least one microbe, and most preferably will comprise an appropriate nutrient supplement necessary for microbes to grow within zone 27 and produce sulfides. Such an appropriate nutrient supplement is readily determinable by persons skilled in the art of microbial growth. Preferably, treatment liquid 31 will not contain excess nutritional supplements beyond what is necessary for the microbes to grow and produce sulfides. Such excess nutritional supplements would generally constitute economic waste.

The particular concentration of microbe nutrient will vary dependent upon the microbe or microbe mix which is utilized. The concentration of microbe nutrient will also vary dependent upon the particular nutrient which is being employed. The concentration of microbe nutrient may also be dependent upon other aspects of the particular waste stack being treated. For example, the chemistry of a particular waste stack may be relatively less favorable or more favorable to microbial conversion of the nutrient in which case the amounts used will be adjusted to effect microbial growth and sulfide production to immobilize metals. An exemplary range of carbohydrate concentration is from about 0.1 to about 10 grams of carbohydrate per liter of liquid.

In one form of the invention, treatment liquid 31 will include a carbohydrate microbe nutrient. It is anticipated that such carbohydrate microbe nutrient will preferably be in the form of either molasses, hydrolyzed potato starch, whey from milk or milk by-products, and whey from milk or milk by-products with the protein fraction removed or substantially removed.

In another form of the invention, treatment liquid 31 will include a carbohydrate microbe nutrient and a biologically suitable and utilizable nitrogen source, such as the preferred ammonium sulfate. The ammonium sulfate is preferably included in amounts sufficient to provide concentrations thereof in the treatment liquid from about 0 to about 500 milligrams per liter, more preferably from about 5 to about 500 milligrams per liter. In this form of the invention, it is anticipated that the carbohydrate microbe nutrient will preferably include molasses, and will most preferably include about 1 gram per liter of molasses and about 8.7 milligrams per liter of ammonium sulfate.

The preferred use of ammonium sulfate also is in some forms of the invention effective to serve as a sulfate source in the treatment liquid. This may be significant in waste stacks where the waste materials do not otherwise provide an adequate sulfate source. The sulfate is significant in allowing microbial production of sulfides which then bind the metals.

In another form of the invention, treatment liquid 31 will comprise a carbohydrate microbe nutrient, phosphate ions and ammonium sulfate. Suitable sources of phosphate ions include sodium phosphate, potassium phosphate, ammonium phosphate and potentially other phosphates. The phosphate is included in sufficient amounts to provide concentrations thereof in the treatment liquid from about 0.025 to about 0.5 grams per liter.

In the most preferred forms of the invention, the cysteine content of the microbe nutrient will be low. Cysteine interferes with microbial production of sulfides. Accordingly, the cysteine content in the treatment liquid will preferably be sufficiently low that the provided microbes are not inhibited from producing microbial sulfides, and most preferably, cysteine will be excluded from treatment liquid 31.

In another aspect of the invention, treatment liquid 31 will include sulfate. However, it is anticipated that waste stack 14 may often contain gypsum (i.e. calcium sulfate), and hence that zone 27 will often include appreciable amounts of sulfate. It is anticipated that this sulfate will be utilized as a nutrient by growing microbes. Thus, it is anticipated that treatment liquid 31 will generally comprise more sulfate when affected zone 27 doesn't comprise gypsum than when the affected zone does comprise gypsum.

In another aspect of the invention, treatment liquid 31 will preferably comprise a pH which opposes the pH of waste stack zone 27, relative to a neutral pH 7. Thus, if zone 27 is alkaline, treatment liquid 31 will preferably be acidic. Also, if zone 27 is acidic, treatment liquid 31 will preferably be alkaline. The opposing pH of treatment liquid 31 is expected to improve penetration of the treatment liquid into stack zone 27. If zone 27 comprises a large percentage of gypsum, as is expected near a phosphate mine for instance, the area is likely to be quite alkaline. In this circumstance, it is anticipated that the pH of the treatment liquid will preferably be from about pH 1 to about pH 2.5.

Sulfide producing microbes are known to generally grow best in environments with a pH from about 3.5 to about 7. A region of waste stack zone 27 comprising such an environment is referred to herein as a biological activity zone. Preferably, the pH and buffer capacity of treatment liquid 31 will be adjusted such that the interaction of the treatment liquid 31 with the affected parts of zone 27 will create a biological activity zone within the stack or other parts of zone 27. It is readily apparent to persons skilled in the art of microbial growth how to adjust the pH and buffer capacity of treatment liquid 31 to create such a biological activity zone within the waste stack zone 27. The biological activity zone is discussed in more detail below under the subsection entitled the "Second Embodiment."

As discussed previously, the method of this invention comprises providing at least one sulfide-producing microbe capable of growing in the presence of treatment liquid 31. This microbe may be provided before, after or during the injection of treatment liquid 31, and is preferably provided in sufficient proximity to treatment passageway 30 to receive treatment liquid 31 therefrom.

In one aspect of the invention, the step of providing the sulfide-producing microbe comprises inoculating at least portions of the treatment passageway with at least one microbe. The microbe may be placed into passageway 30 prior to, subsequent to, or during the injection of liquid 31 into passageway 30.

In another aspect of the invention, the step of providing the sulfide-producing microbe comprises mixing the microbe with treatment liquid 31 and injecting the mixture into treatment passageway 30 to inoculate at least portions of the treatment passageway with the microbe.

In another aspect of the invention the step of providing the sulfide-producing microbe comprises utilizing microbes already existing within zone 27 before liquid 31 is injected. The pre-existence of the microbes within zone 27 may be due to human implantation, airborne dispersion or natural conditions of the waste stack feed stream.

The method of the present invention may further comprise a step of injecting one or more supplemental feedings of treatment liquid 31 into treatment passageway 30. The supplemental feedings are injected after at least one prior injection of treatment liquid 31, and preferably after the sulfide-producing microbes have begun to grow. The supplemental feedings are provided to sustain the growth of the sulfide-producing microbes. It is anticipated that the sulfide-producing microbes will produce sulfides over a longer period of time if supplemental feedings are provided. Such long-term generation of sulfides may be advantageous for better immobilizing metal ions. Since sulfides may eventually be displaced from the coordination sphere of the metal ions through equilibrium processes, the long-term generation of sulfides could help to insure that such displaced sulfides would be rapidly replaced by other sulfides.

Second Embodiment

Referring to FIG. 3, a second embodiment of the present invention comprises treating the waste stack via a surface pool 53 which exists on at least portions of waste stack zone 27. Pool 53 is treated using a pool treatment composition 35. Treatment composition 35 then percolates into stack 14. In the embodiment shown, pool 53 is on top of waste stack 14 and treatment composition 35 is added to the liquid of pool 53 subsequent to providing the waste slurry on top of stack 14. However, it is expected that treatment composition 35 may also be combined with the liquid of pool 53 prior to providing the liquid onto stack 14. In another form of the invention, the treatment composition is merely added to the slurry or other waste liquid and applied to the pool 53 or otherwise upon the waste stack. The waste liquid is treated with treatment composition or otherwise so as to provide the treatment liquid described above which is applied to the exterior of the stack.

In one aspect of the invention, pool treatment composition 35 will preferably comprise a pH which opposes the pH of affected zone 27. The purpose of this opposing pH is two-fold. First, the opposing pH enhances the penetration of microbe nutrients into affected zone 27. Second, the opposing pH will neutralize a strongly acid or strongly alkaline portions of zone 27 to create a biological activity zone within the affected zone.

The second purpose is illustrated in FIG. 3. FIG. 3 presumes portions of zone 27 are strongly alkaline, such as occur in a gypsum-containing affected zone 27. The preferred pool treatment composition 35 is thus acidic. A pH scale on the left of FIG. 3 estimates the pH at different places within the stack. The pool treatment composition 35 flowing onto the top of waste stack 14 is acid, and FIG. 3 indicates that the pH at the bottom of waste stack 14 remains alkaline.

As shown in FIG. 3, a pH gradient forms along a vertical axis Y of affected zone 27 as the acidic pool treatment composition 35 percolates through the alkaline affected zone 27. The pH gradient forms a biological activity zone 52 which extends along vertical axis Y of affected zone 27. It is anticipated that the pH of pool treatment composition 35 will preferably be adjusted to extend biological activity zone 52 across affected zone 27.

Although FIG. 3 illustrates a waste stack which tends to be alkaline, persons of ordinary skill in the art will appreciate that the embodiment shown in FIG. 3 can alternatively be applicable to acidic waste stack zones. If zone 27 were acidic, treatment composition 35 would preferably be alkaline and the pH scale on the left of FIG. 3 would be changed to go from high pH to low pH downwardly.

In another aspect of the invention, pool treatment composition 35 is added to a waste stream 50 flowing onto waste stack 14. It is anticipated that the pH of waste stream 50 will also be preferably adjusted to oppose the pH of affected zone 27 via the addition of pool treatment composition 35.

In a preferred aspect of the invention, pool treatment composition 35 will be flowed into pool 53 utilizing a pump-driven flow. However, it is also anticipated that pool treatment composition 35 may be flowed into pool 53 utilizing a gravity-driven flow.

The process of the second embodiment comprises providing at least one sulfide-producing microbe which is capable of growing in the presence of pool treatment composition 35. The microbe may be provided before, after or during the provision of pool treatment composition 35.

In one aspect of the invention, the step of providing the sulfide-producing microbe comprises mixing the microbe with pool treatment composition 35 and flowing the mixture onto waste stack 14.

In another aspect of the invention, the step of providing the sulfide-producing microbe comprises utilizing microbes already existing in affected zone 27 before pool treatment 35 is provided in waste stack 14.

Pool treatment composition 35 will preferably include at least one microbe nutrient which is a nutrient capable of sustaining activity of a provided microbe. Treatment composition 35, like the treatment liquid 31 discussed above, may comprise one or more of the items selected from the group consisting of carbohydrate microbe nutrients, phosphate ions, and ammonium sulfate. The carbohydrate, phosphate ions or ammonium sulfate present in treatment composition 35 will preferably be provided in quantities sufficient to bring the concentration of these items in pool 53 to the preferable levels discussed above regarding the first embodiment, and will most preferably be provided in quantities sufficient to bring the concentration of these items in pool 53 to the most preferable levels discussed above regarding the first embodiment. Also, the cysteine content in treatment composition 35 will preferably be sufficiently low that the provided microbes are not inhibited from producing microbial sulfides, and most preferably, cysteine will be excluded from treatment composition 35.

The method of the present invention may further comprise a step of providing one or more supplemental feedings of microbe nutrient into affected zone 27 using one or more additions of pool treatment composition 35. The supplemental feedings should be flowed onto the stack after at least one prior feeding of microbe nutrient, and preferably after the sulfide-producing microbes have begun to grow. The supplemental feedings are provided to sustain the growth of the sulfide-producing microbes. It is anticipated that the sulfide-producing microbes will produce sulfides over a longer period of time if supplemental feedings are provided. As discussed previously, longer term generation of sulfides may be advantageous for maximally immobilizing metal ions.

Third Embodiment

Referring to FIG. 4, a third embodiment of this invention comprises a combination of the first and second embodiments. In the third embodiment, a pool treatment composition 35 is provided according to the method of the second embodiment of the invention. Also, at least one treatment passageway 30 is formed and used according to the method of the first embodiment of the invention.

In one aspect of the invention, pool treatment composition 35 is provided simultaneously as treatment liquid 31 is provided.

In another aspect of the invention, pool treatment composition 35 is provided sequentially to the provision of treatment liquid 31.

In another aspect of the invention, treatment liquid 31 and pool treatment composition 35 are microbe-nutrient-containing fluids having identical compositions.

In another aspect of the invention, treatment liquid 31 and pool treatment composition 35 are microbe-nutrient-containing fluids having different compositions.

This third embodiment of the invention further comprises providing at least one sulfide-producing microbe which grows in the presence of treatment liquid 31 and pool treatment composition 35. The pool treatment composition 35 may in some forms of the invention be a liquid waste stream treated as described above.

In one aspect of the invention, the microbe is provided simultaneously as treatment liquid 31 or pool treatment composition 35 is provided.

In another aspect of the invention, the microbe may be provided sequentially, before or after, to the steps of providing treatment liquid 31 and pool treatment composition 35.

In another aspect, the microbe is provided by the method of the first embodiment and microbe nutrient is provided by the method of the second embodiment. In other words, the microbe is inoculated via passageway 30 and microbe nutrient is provided in a pool treatment composition 35.

In another aspect of the invention, the microbe is provided by the method of the second embodiment and microbe nutrient is provided by the method of the first embodiment. In other words, the microbe is provided in pool treatment composition 35 and microbe nutrient is injected via a passageway 30.

EXAMPLES FOR CARRYING OUT THE INVENTION

Without further elaboration, it is believed that one skilled in the art can, using the preceding description, utilize the present invention to its fullest extent. The following specific examples are, therefore, to be construed as merely illustrative and not limiting of the remainder of the disclosure in any way whatsoever. In the following examples, it is assumed that the stacks to be treated are gypsum-containing stacks. It is further assumed that the appropriate microbes already exist either within the stack or within the boundary layer below the stack. Accordingly, the step of providing microbes is accomplished merely by using the microbes that already exist within an affected zone. The following examples detail specific preferred parameters that have been experimentally determined using mock waste stacks in a laboratory. The mock waste stacks comprised columns of gypsum overlaying blended soils. The preferred parameters were experimentally determined by analyzing the results obtained from flowing various aqueous mixtures of nutrient and pH through these columns. It was also determined that the presence of drinking level quantities of fluoride in the aqueous mixtures did not affect the results of these experiments.

EXAMPLE 1

Metal ions in a gypsum-containing waste stack will be immobilized by flowing a fluid pool onto a stack. The fluid pool will be treated with a pool treatment composition so that the pool contains from about 0.15 to about 10 grams per liter of carbohydrate microbe nutrient, from about 0.01 to about 0.25 grams per liter of phosphate ion, and from about 0.025 to about 0.5 grams per liter of ammonium sulfate as it flows onto the stack. Cysteine will be specifically excluded from the treatment composition. The pool treatment composition will be buffered and pH adjusted to maintain the pH of the pool from about pH 1 to about pH 2.5 as the pool is flowed onto the stack.

EXAMPLE 2

Metal ions in a gypsum-containing waste stack will be immobilized by injecting a treatment liquid containing from about 0.15 to about 10 grams per liter of carbohydrate, from about 0.01 to about 0.25 grams per liter of phosphate ion and from about 0.025 to about 0.5 grams per liter of ammonium sulfate into a treatment passageway in a stack. Cysteine will be specifically excluded from the treatment liquid. The pH of the treatment liquid will be maintained from about pH 1 to about pH 2.5 as the liquid is injected into the stack.

EXAMPLE 3

Metal ions in a waste stack will be immobilized by providing a treatment liquid into a passageway in gypsum-containing stack. A continuous supplemental feeding of fluid will also be flowed onto the stack in the form of a fluid pool. The treatment liquid and fluid pool will each comprise from about 0.15 to about 10 grams per liter of carbohydrate, from about 0.01 to about 0.25 grams per liter of phosphate ion and from about 0.025 to about 0.5 grams per liter of ammonium sulfate. Cysteine will be specifically excluded from the fluid pool and from the treatment liquid. The pH of the fluid pool will be maintained from about pH 1 to about pH 2.5 as the fluid pool is flowed onto the stack.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A process for in situ immobilization of metals in waste stacks, soils, or earth materials having metals therein, comprising:

forming at least one treatment passageway which extends into said waste stacks, soils, or earth materials;

injecting a treatment liquid into the treatment passageway; said treatment liquid including at least one microbe nutrient which is capable of sustaining activity of at least one microbe;

providing at least one microbe in sufficient proximity to the treatment passageway to receive treatment liquid therefrom; said at least one microbe being capable of growing in the presence of said treatment liquid; said at least one microbe also being capable of producing microbial sulfides which are sulfide by-products of microbial activity in said waste stacks, soils, or earth materials;

reacting the microbial sulfides in situ with metal ions or metal-containing compounds contained in said waste stacks, soils, or earth materials to form metal sulfides;

reducing solubility of the metal ions or metal-containing compounds contained in said waste stacks, soils, or earth materials as a result of forming the metal sulfides;

inhibiting the migration rate of metal ions or metal-containing compounds within or from said waste stacks, soils, or earth materials.

2. A process according to claim 1 wherein the step of injecting a treatment liquid is further characterized by the at least one microbe nutrient including a carbohydrate microbe nutrient.

3. A process according to claim 1 wherein the step of injecting a treatment liquid is further characterized by the at least one microbe nutrient including a carbohydrate microbe nutrient and ammonium sulfate.

4. A process according to claim 1 wherein the step of providing at least one microbe includes inoculating at least portions of the treatment passageway with said at least one microbe.

5. A process according to claim 1 wherein the step of providing at least one microbe includes inoculating at least portions of the treatment passageway with said at least one microbe; said inoculating occurring by including the at least one microbe in the treatment liquid.

6. A process according to claim 1 wherein the process further comprises a step of injecting one or more supplemental feedings of treatment liquid.

7. A process according to claim 1 wherein the step of providing at least one microbe includes inoculating at least portions of the treatment passageway with said at least one microbe; said inoculating occurring by placing said at least one microbe in the treatment passageway after the forming step and prior to injecting treatment liquid in the treatment passageway.

8. A process according to claim 1 wherein the step of providing at least one microbe includes relying upon natural microbes which exist in said waste stacks, soils, or earth materials.

9. A process according to claim 1 wherein the step of providing a microbe comprises utilizing microbes that previously existed in said waste stacks, soils, or earth materials before the step of forming at least one treatment passageway.

10. A process according to claim 1 wherein the step of forming at least one treatment passageway comprises drilling into said waste stacks, soils, or earth materials.

11. A process according to claim 1 wherein the step of injecting a treatment liquid comprises injecting a treatment fluid having a pH from about 1 to about 2.5.

12. A process according to claim 1 wherein the step of injecting a treatment liquid comprises injecting a treatment liquid from which cysteine is specifically excluded.

13. A process according to claim 1 wherein the step of injecting includes forcing treatment liquid through the treatment passageway.

14. A process according to claim 1 wherein the step of injecting includes flowing treatment liquid through the treatment passageway under the force of gravity.

15. A process according to claim 1 wherein the step of forming at least one treatment passageway comprises forming at least one treatment passageway to a depth within said waste stacks, soils, or earth materials wherein said waste stacks, soils, or earth materials have a pH from about 3.5 to about 7.

16. A process according to claim 1 wherein the process further comprises treating a surface pool which exists on at least portions of said waste stacks, soils, or earth materials using a pool treatment composition; said pool treatment composition including at least one microbe nutrient which is a nutrient capable of sustaining activity of the at least one microbe.

17. A process according to claim 1 wherein the step of reacting the microbially produced sulfides comprises reacting the microbially produced sulfides with at least one metal selected from the group consisting of As, Se, Cd, Hg, Cu, and Cr.

18. A process according to claim 1 wherein the step of injecting a treatment liquid is done using a treatment liquid which is sufficiently low in cysteine content so that the at least one microbe are not inhibited from producing microbial sulfides.

19. A process according to claim 1 wherein the step of injecting a treatment liquid is further characterized by a treatment liquid which comprises from about 0.15 to about 10 grams per liter of carbohydrate.

20. A process according to claim 1 herein the step of injecting a treatment liquid is further characterized by a treatment liquid which comprises from about 0.15 to about 10 grams per liter of carbohydrate and from about 0.025 to about 0.5 grams per liter of ammonium sulfate.

21. A process according to claim 1 wherein the step of injecting a treatment liquid is further characterized by a treatment liquid which comprises carbohydrate, phosphate ion and ammonium sulfate.

22. A process according to claim 1 wherein the step of injecting a treatment liquid comprise injecting and flowing a treatment liquid which comprises from about 0.15 to about 10 grams per liter of carbohydrate, from about 0.01 to about 0.25 grams per liter of phosphate ion and from about 0.025 to about 0.5 grams per liter of ammonium sulfate.

23. A process according to claim 1 wherein the step of injecting a treatment liquid is further characterized by a treatment liquid which comprises molasses and ammonium sulfate.

24. A process according to claim 1 wherein the step of injecting a treatment liquid is further characterized by a treatment liquid which comprises approximately 1 gram per liter of molasses and approximately 8 milligrams per liter of ammonium sulfate.

25. A process according to claim 1 wherein the step of injecting a treatment liquid is further characterized by a treatment liquid which comprises hydrolyzed potato starch and ammonium sulfate.

26. A process according to claim 1 wherein the step of providing at least one microbe comprises providing one or more microbes of a genus selected from the group consisting of the genera Desulfovibrio, Desulfomonas and Desulfomaculum.

27. A process for in situ immobilization of metals in waste stacks, soils, or earth materials, comprising:
treating a surface pool which exists on at least portions of said waste stacks, soils, or earth materials using a pool treatment composition;
providing at least one microbe in said waste stacks, soils, or earth materials; said at least one microbe being capable of growing in the presence of said treatment composition; said at least one microbe also being capable of producing microbial sulfides which are sulfide by-products of microbial activity in said waste stacks, soils, or earth materials;
said pool treatment composition including at least one microbe nutrient which is a nutrient capable of sustaining activity of the at least one microbe;
percolating pool treatment composition into said waste stacks, soils, or earth materials from the surface pool;
reacting the microbial sulfides in situ with metal ions or metal-containing compounds contained in said waste stacks, soils, or earth materials to form metal sulfides;
reducing solubility of the metal ions or metal-containing compounds contained in said waste stacks, soils, or earth materials as a result of forming the metal sulfides;
inhibiting the migration rate of metal ions or metal-containing compounds within or from said waste stacks, soils, or earth materials.

28. A process according to claim 27 wherein the step of providing at least one microbe comprises:
forming at least one treatment passageway which extends within said waste stacks, soils, or earth materials;
inoculating at least portions of the treatment passageway with said at least one microbe.

29. A process according to claim 28 wherein the step of forming at least one treatment passageway comprises drilling into said waste stacks, soils, or earth materials.

30. A process according to claim 28 wherein the step of forming at least one treatment passageway comprises drilling into and through said waste stacks, soils, or earth materials.

31. A process according to claim 28 wherein the step of forming at least one treatment passageway comprises forming at least one treatment passageway to a depth within said waste stacks, soils, or earth materials wherein said waste stacks, soils, or earth materials have a pH from about 3.5 to about 7.

32. A process according to claim 27 wherein the step of providing at least one microbe is done before the step of treating a surface pool.

33. A process according to claim 27 wherein the step of providing a microbe is done simultaneously with the step of treating a surface pool.

34. A process according to claim 27 wherein the step of treating a surface pool is further characterized by the at least one microbe nutrient including a carbohydrate microbe nutrient.

35. A process according to claim 27 wherein the step of treating a surface pool is further characterized by the at least one microbe nutrient including a carbohydrate microbe nutrient and ammonium sulfate.

36. A process according to claim 27 wherein the step of providing at least one microbe includes relying upon natural microbes which exist in said waste stacks, soils, or earth materials.

37. A process according to claim 27 wherein the step of treating a surface pool is further characterized by a pool treatment composition which brings the pH of the pool to a range of from about 1 to about 2.5.

38. A process according to claim 27 wherein the step of treating a surface pool is further characterized by a pool treatment composition from which cysteine is specifically excluded.

39. A process according to claim 27 wherein the step of reacting the microbially produced sulfides comprises reacting the microbially produced sulfides with at least one metal selected from the group consisting of As, Se, Cd, Hg, Cu, and Cr.

40. A process according to claim 27 wherein the step of treating a surface pool is further characterized by a pool treatment composition which comprises from about 0.15 to about 10 grams per liter of carbohydrate.

41. A process according to claim 27 wherein the step of treating a surface pool is further characterized by a pool treatment composition which comprises from about 0.15 to about 10 grams per liter of carbohydrate and from about 0.025 to about 0.5 grams per liter of ammonium sulfate.

42. A process according to claim 27 wherein the step of treating a surface pool is further characterized by a pool treatment composition which comprises carbohydrate, phosphate ion and ammonium sulfate.

43. A process according to claim 27 wherein the step of treating a surface pool is further characterized by a pool treatment composition which comprises from about 0.15 to about 10 grams per liter of carbohydrate, from about 0.01 to about 0.25 grams per liter of phosphate ion and from about 0.025 to about 0.5 grams per liter of ammonium sulfate.

44. A process according to claim 27 wherein the step of treating a surface pool is further characterized by a pool treatment composition which comprises molasses and ammonium sulfate.

45. A process according to claim 27 wherein the step of treating a surface pool is further characterized by a pool treatment composition which comprises approximately 1 gram per liter of molasses and approximately 8 milligrams per liter of ammonium sulfate.

46. A process according to claim 27 wherein the step of treating a surface pool is further characterized by a pool treatment composition which comprises hydrolyzed potato starch and ammonium sulfate.

47. A process according to claim 27 wherein the step of providing at least one microbe comprises providing one or more microbes of a genus selected from the group consisting of the genera Desulfovibrio, Desulfomonas and Desulfomaculum.

48. A process for in situ immobilization of metals in waste stacks, soils, or earth materials, comprising:
   flowing a liquid onto said waste stacks, soils, or earth materials; said liquid including at least one microbe nutrient which is capable of sustaining activity of at least one microbe;
   providing at least one microbe in said waste stacks, soils, or earth materials to receive said at least one microbe nutrient from said liquid flowed onto said waste stacks, soils, or earth materials; said at least one microbe being capable of growing in the presence of said liquid and said at least one microbe nutrient; said at least one microbe also being capable of producing microbial sulfides which are sulfide by-products of microbial activity in said waste stacks, soils, or earth materials;
   reacting the microbial sulfides in situ with metal ions or metal-containing compounds contained in said waste stacks, soils, or earth materials to form metal sulfides;
   reducing solubility of the metal ions or metal-containing compounds contained in said waste stacks, soils, or earth materials as a result of forming the metal sulfides;
   inhibiting the migration rate of metal ions or metal-containing compounds within or from said waste stacks, soils, or earth materials.

49. A process for in situ immobilization of metals in waste stacks, soils, or earth materials, comprising:
   flowing a waste liquid onto said waste stacks, soils, or earth materials, said waste liquid including at least one microbe nutrient which is capable of sustaining activity of at least one microbe; said at least one microbe also being capable of producing microbial sulfides which are sulfide by-products of microbial activity in said waste stacks, soils, or earth materials;
   reacting the microbial sulfides in situ with metal ions or metal-containing compounds contained in said waste stacks, soils, or earth materials to form metal sulfides;
   reducing solubility of the metal ions or metal-containing compounds contained in said waste stacks, soils, or earth materials as a result of forming the metal sulfides;
   inhibiting the migration rate of metal ions or metal-containing compounds within or from said waste stacks, soils, or earth materials.

50. A process for in situ immobilization of metals in waste stacks, soils, or earth materials, comprising:
   flowing a waste liquid onto said waste stacks, soils, or earth materials; said waste liquid including at least one microbe and at least one microbe nutrient which is capable of sustaining activity of the at least one microbe; said at least one microbe also being capable of producing microbial sulfides which are sulfide by-products of microbial activity in said waste stacks, soils, or earth materials;
   reacting the microbial sulfides in situ with metal ions or metal-containing compounds contained in said waste stacks, soils, or earth materials to form metal sulfides;
   reducing solubility of the metal ions or metal-containing compounds contained in said waste stacks, soils, or earth materials as a result of forming the metal sulfides;
   inhibiting the migration rate of metal ions or metal-containing compounds within or from said waste stacks, soils, or earth materials.

51. A process for in situ immobilization of metals in waste stacks, soils, or earth materials, comprising:
   adding at least one microbe nutrient which is capable of sustaining activity of at least one microbe to a liquid;
   flowing the liquid with added at least one microbe nutrient onto said waste stacks, soils, or earth materials; said liquid being at a low pH;
   wherein there is at least one microbe within said waste stacks, soils, or earth materials; said at least one microbe being inactive in said waste stacks, soils, or earth materials except at locations in which the pH increases due to neutralization of the low pH liquid as the liquid flows into said waste stacks, soils, or earth materials;
   said at least one microbe also being capable of producing microbial sulfides which are sulfide by-products of microbial activity in said waste stacks, soils, or earth materials;
   reacting the microbial sulfides in situ with metal ions or metal-containing compounds contained in said waste stacks, soils, or earth materials to form metal sulfides;
   reducing solubility of the metal ions or metal-containing compounds contained in said waste stacks, soils, or earth materials as a result of forming the metal sulfides;
   inhibiting the migration rate of metal ions or metal-containing compounds within or from said waste stacks, soils, or earth materials.

* * * * *